(12) United States Patent
Wang Chen

(10) Patent No.: US 10,283,813 B1
(45) Date of Patent: May 7, 2019

(54) IONIC LIQUID ELECTROLYTE IN AN ENERGY STORAGE DEVICE AND METHOD OF MAKING THE SAME

(71) Applicant: High Tech Battery Inc., Taipei (TW)

(72) Inventor: Kuei Yung Wang Chen, Taipei (TW)

( * ) Notice: Subject to any disclaimer, the term of this patent is extended or adjusted under 35 U.S.C. 154(b) by 0 days.

(21) Appl. No.: 15/954,503

(22) Filed: Apr. 16, 2018

(51) Int. Cl.
  *H01M 10/0565* (2010.01)
(52) U.S. Cl.
  CPC .......... *H01M 10/0565* (2013.01); *H01M 2300/0025* (2013.01); *H01M 2300/0065* (2013.01); *H01M 2300/0085* (2013.01)
(58) Field of Classification Search
  CPC ..... H01M 10/0565; H01M 2300/0025; H01M 2300/0065; H01M 2300/0085
  See application file for complete search history.

(56) References Cited

U.S. PATENT DOCUMENTS

| | | | | |
|---|---|---|---|---|
| 2006/0120021 A1* | 6/2006 | Banno | ............ | H01G 9/02 361/502 |
| 2010/0102265 A1* | 4/2010 | Lin | ............ | H01G 9/2009 252/62.2 |
| 2011/0274982 A1* | 11/2011 | Kaneko | ............ | H01M 4/133 429/303 |
| 2014/0017557 A1* | 1/2014 | Locket | ............ | H01M 10/0565 429/189 |
| 2014/0205909 A1* | 7/2014 | Yonehara | ............ | H01M 4/48 429/302 |
| 2015/0249261 A1* | 9/2015 | Dai | ............ | H01M 10/054 429/336 |
| 2016/0156024 A1* | 6/2016 | Kinpara | ............ | H01M 4/36 252/511 |

* cited by examiner

*Primary Examiner* — Jonathan G Jelsma
(74) *Attorney, Agent, or Firm* — Patent GC; Naomi S. Biswas

(57) ABSTRACT

A non-liquid electrolyte for use in an energy storage device comprising a mixture of ionic liquid and a thickener that interact to evolve into a gel network, wherein the thickener comprises a macromolecule; and a method of making the same.

25 Claims, 2 Drawing Sheets

IONIC LIQUID ELECTROLYTE IN AN ENERGY STORAGE DEVICE AND METHOD OF MAKING THE SAME

FIELD OF THE INVENTION

The present invention relates to an electrolyte for use in an energy storage device, for example particularly, but not exclusively, a non-liquid electrolyte for use in a battery.

BACKGROUND OF THE INVENTION

High-rate rechargeable batteries with long cycle life at reasonable cost are of high demand for powering motor vehicle and as a source of renewal energy replacing fossil fuels. A known alternative would be Lithium-ion batteries but the number of complete charge/discharge cycles that the battery is able to support before its capacity falling under 80% of its original capacity is less than 2000 cycles. The expensiveness of Lithium-ion batteries is another disadvantage in addition to the flammability of the electrolytes.

Aluminum is always an attractive material for batteries for its low cost, low flammability and high-charge storage capacity. Scientists have invented high-performance aluminum battery that is fast charging, long lasting and relatively inexpensive. It is considered a safe alternative replacing existing storage devices. Aluminum has a specific capacity of 2980 mAh $g^{-1}$ and volumetric capacity of 8046 mAh $cm^{-3}$ which are higher than those of lithium. However secondary aluminum-based batteries are only possible in non-aqueous electrolytes with larger electrochemical stability window because aluminum re-deposition occurs at a more negative potential −1.68V vs. SHE. (Standard hydrogen electrode) In the earlier days only aqueous or high temperature molten salt system are used. One concern is that aluminum in neutral or acidic electrolyte has a potential of −1.68V vs. SHE, and when the potential reaches −1.23V, electrolysis of water occurs. This make aqueous electrolyte unsuitable for high-performance energy storage devices with redox potentials outside the stability window of water.

Ionic liquids are widely promoted as designer electrolytes. The key attraction of ionic liquid is the wide electrochemical stability window. Most ionic liquids show high thermal stability, non-flammability, non-volatility and lower vapor pressure. It has relatively low toxicity comparing to organic solvents.

The invention seeks to eliminate or at least to mitigate such shortcomings by providing a non-liquid electrolyte for use in a battery.

SUMMARY OF THE INVENTION

In a first aspect of the invention there is provided a non-liquid electrolyte for use in an energy storage device comprising a mixture of ionic liquid and a thickener that interact to evolve into a gel network, wherein the thickener comprises a macromolecule.

Preferably, the ionic liquid comprises a mixture of 1-ethyl-3-methylimidazolium and anhydrous aluminum chloride with a mole ratio of anhydrous aluminum chloride/ 1-ethyl-3-methylimidazolium from 1.1 to 2.0, and water content at or below 300 ppm, wherein the 1-ethyl-3-methylimidazolium comprises:

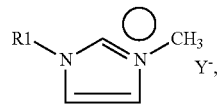

Y = halogen wherein R1 comprises a carbon chain with from 1 to 8 carbon atoms.

More preferably, the thickener on a separator is released to interact with ionic liquid in a controlled manner, wherein the separator comprises a non-woven or porous membrane.

It is preferable that the thickener is placed on support structure to forma sheet material, which is placed between cathode and anode of said energy storage device for releasing the thickener into the ionic liquid at a controlled manner for interaction. Advantageously, the support structure comprises a porous membrane, preferably a woven/non-woven membrane, formed from a material selected from a group consisting PTFE, PAN, glass fiber and PI. More advantageously, the macromolecule is at least one of aldehyde and amide polymer. Yet more advantageously, the aldehyde polymer comprises polyoxymethylene. Preferably, the amide polymer comprises nylon. More preferably, the polyoxymethylene is of a molecular weight of 10,000-500,000. Yet more preferably, the aldehyde polymer is of 4-30 weight %. Advantageously, the amide polymer is of 2-20 weight %.

In a second aspect of the invention, there is provided a method of making with a non-liquid electrolyte for use in an energy storage device comprising the steps of: providing an ionic liquid, providing a thickener, mixing the ionic liquid with the thickener at specific temperature for a specific mixing time thereby allowing the ionic liquid to interact with the thickener to evolve into a gel network, wherein the thickener comprises a macromolecule.

Preferably, the ionic liquid comprises a mixture of 1-ethyl-3-methylimidazolium and anhydrous aluminum chloride, with a mole ratio of anhydrous aluminum chloride/ 1-ethyl-3-methylimidazolium from 1.1 to 2.0, and water content at or below 300 ppm, wherein the 1-ethyl-3-methylimidazolium comprises:

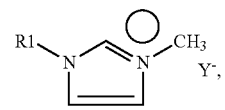

Y = halogen wherein R1 comprises a carbon chain with from 1 to 8 carbon atoms.

More preferably, the macromolecule is at least one of aldehyde and amide polymer. Yet more preferably, the aldehyde polymer comprises polyoxymethylene. Advantageously, the amide polymer comprises nylon. More advantageously, the polyoxymethylene is of a molecular weight of 10,000-500,000. Yet more advantageously, the aldehyde polymer is of 4-30 weight %. Preferably, the amide polymer is of 2-20 weight %. Preferably, the method further comprises the step of forming a separator comprising the thickener which is released into and interacts with the ionic liquid in a controlled manner, wherein the separator comprises a non-woven or porous membrane.

It is preferable that the method further comprises the step of placing the thickener on a support structure to form a sheet material which is placed between cathode and anode of said energy storage device for releasing the thickener into the ionic liquid at a controlled manner. Yet more preferably, the support structure comprises a porous membrane, preferably a woven/non-woven membrane, formed from a material selected from a group consisting PTFE, PAN, glass fiber and PI.

Advantageously, the thickener is placing on the support structure by a method selected from a group consisting adhesion; electrospinning; meltblown technology; impregnating a solution comprises the thickener on the support material; and propelling a stream of high pressure gas comprises the thickener against the support material.

Preferably, the specific temperature is about 50-140° C.; wherein the specific mixing time is about 1 to 16 hours.

In a third aspect of the invention there is provided an energy storage device comprising the electrolyte as detailed above.

In a fourth aspect of the invention, there is provided an energy storage device comprising the electrolyte formed from the method as detailed above.

DETAILED DESCRIPTION

Figure 1:
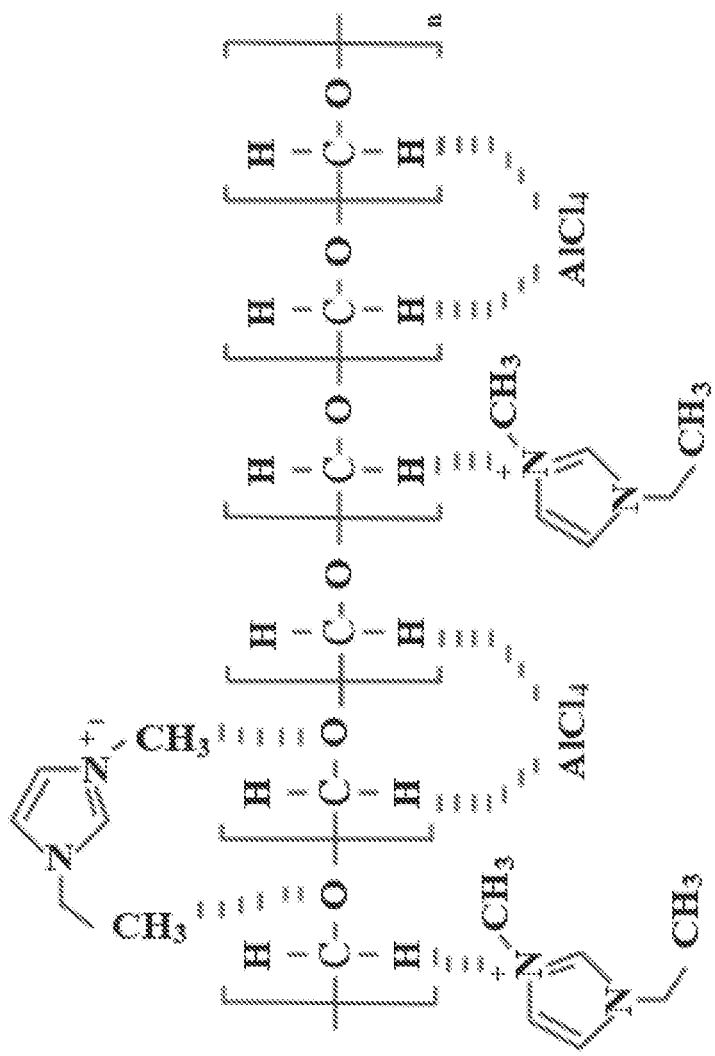
FIG. 1 is a chemical structure of a first embodiment of a component of the invention.
Figure 2:
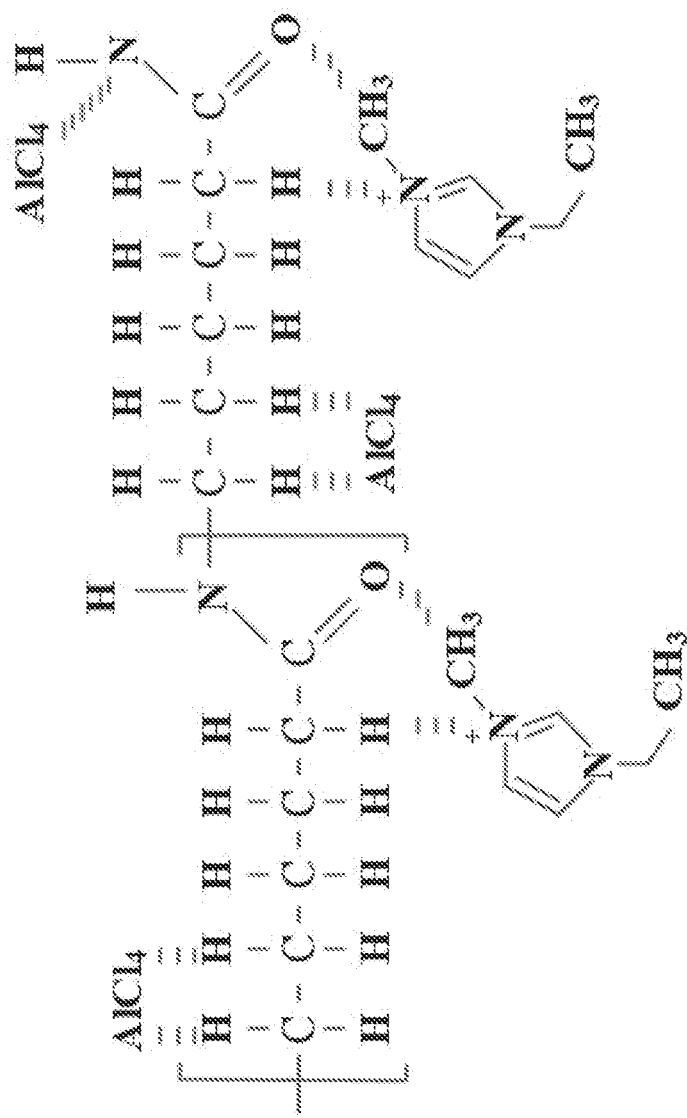
FIG. 2 is a chemical structure of a second embodiment of a component of the invention.

FIGS. 1 and 2 show the chemical structure of two preferred embodiments of a component of the invention.

The invention involves the application of a colloidal or non-fluid electrolyte in an energy storage device. The non-fluid electrolyte has a non-definite shape and can be manipulated to adopt different shapes according to needs. The invention removes the limitations on the physical shape as well as the concerns regarding electrolyte leakage of a battery yet without scarifying the benefits of ionic liquids including wide electrochemical stability window, low toxicity, high thermal stability, non-flammability, non-volatility and low vapor pressure.

In the preferred embodiment, the ionic liquid electrolyte comprises a mixture of 1-ethyl-3-methylimidazolium chloride and anhydrous aluminum chloride in a predetermined ratio. It would be appreciated that other ionic liquids may be used as alternatives such as 1-hexyl-3-methyl-imidazolium chloride, 1-octyl-3-methylimidazoliumchloride and 1-dodecyl-3-methylimidazolium. A thickening agent, in the form of a macromolecule, is added to the mixture of 1-ethyl-3-methylimidazolium chloride and anhydrous aluminum chloride. The macromolecule may be an organic polymer which is preferably POM (polyoxymethylene), also known as acetal, polyacetal and polyformaldehyde with high stiffness, low friction and excellent dimensional stability. The molecular weight of the POM is preferably about 10000-500000. At a specific temperature range of 50-140° C. POM is added to the ionic liquid which is formed by mixing 1-ethyl-3-methylimidazolium chloride and anhydrous aluminum chloride. The POM and the ionic liquid interacts therewith, for a period which may be any amount of time from 1 hour to 12 days, to form a gel network which is considered to be a colloidal, non-liquid or solid state. Before the interaction is completed, the mixture remains in general a liquid that can be poured into a mold in which the interaction continues to result into a colloidal or non-liquid electrolyte that takes up the shape of the mold by way of casting. The non-liquid electrolyte may be formed with moisture content of 300 ppm or below.

A mold is provided with cathode and anode before the mixture of ionic liquid and POM is added thereto and cured therein such that the relative positions of the cathode and anode is fixed as the mixture is cured. Aluminum plate may be used as the negative electrode while pyrolytic graphite, MXene, natural graphite, sulfide or sulphur may form the positive electrode. In a preferred embodiment, the electrodes are separated by a support structure which may be in the form of PTFE (polytetrafluoroethylene), PAN (polyacrylonitrile), glass fiber and PI (polyimide).

Example 1

1-ethyl-3-methylimidazolium and anhydrous aluminum chloride are very sensitive to moisture. Moisture in the raw materials and equipment are removed before use and the formation of the aluminum battery is carried out under a controlled environment with minimum exposure to moisture. The water-oxygen level in the controlled environment is at or below 1 ppm. Circulation glovebox is useful in providing the controlled environment as it includes a purification system that circulates gas in the glovebox over a catalyst to lower trace impurities, oxygen, and water to levels below 1 ppm.

1-ethyl-3-methylimidazolium is heated to 70° C. in a vacuum oven for 24-48 hours for dehydration. The ionic liquid is formed by slowly adding 118 g of anhydrous aluminum chloride to a trough that contains 100 g of the 1-ethyl-3-methylimidazolium chloride for mixing. During mixing, the temperature of the mixture is maintained at 70° C. under the pressure of 1 atm until all of the anhydrous aluminum chloride is dissolved. The mole ratio of anhydrous aluminum chloride and 1-ethyl-3-methylimidazolium chloride is from 1.1 to 2.0 and preferably 1.3.

Referring to FIG. 1, POM with molecular weight of 10,000-500,000 is considered suitable and may be used as the thickener. In this example, the POM has a molecular weight of 70000. The amount of POM added is about 4 to 30 weight %. At the temperature of 50-80° C., it takes about 1 to 16 hours to dissolve the POM in the ionic liquid. The mixture will slowly solidify or cure. Before curing, the mixture is poured into a mold and is allowed to solidify. The water content of the cured electrolyte is at or below 300 ppm.

To form an energy storage device with the mixture, the negative electrode provided is preferably an aluminum plate and the positive electrode may bean intercalation host such as pyrolytic graphite, MXene, natural graphite, sulfide or sulphur. Molybdenum foil or nickel foil may act as collector. A separator is placed between the positive and negative electrodes and the uncured electrolyte is poured into the mold and allowed to solidify therein. The separator may be a non-woven or porous membrane made of PTFE, glass fiber, PAN (polyacrylonitrile) fiber or PI porous membrane.

Example 2

Example 2 is generally the same as Example 1 but instead of POM, polyamide nylon is used as the thickening agent as shown in FIG. 2. The amount of polyamide nylon added is about 2 to 20 weight %. At the temperature of 80° C., it takes about 1 to 16 hours to dissolve the polyamide nylon in the ionic liquid. The mixture will slowly solidify or cure. Before curing, the mixture is poured into a mold and allowed to solidify therein and takes up the shape of the mold. The water content of the cured electrolyte is at or below 300 ppm.

Example 3

In this example, no separator is provided. It involves direct addition of the aldehyde or amide polymer into the ionic liquid. The mixture is poured into a mold with anode and cathode positioned therein. The mixture is cured in the mold to form a colloidal or non-fluid electrolyte in which the relative positions of the anode and cathode are fixed thereby resulting the preferred energy storage device. The ionic liquid is poured into the mold in which the anode and the cathode are provided. The amount of ionic liquid added is about 2 to 30 wt % of the aldehyde or amide polymer. The thickener interacts with ionic liquid in a controlled manner.

At the temperature of 80° C., it takes about 16 hours to solidify or cure the gel (non-liquid) electrolyte to become the separate that separates electrodes and permits ion conduction.

Example 4

The thickener as detailed in Example 3 is placed or adhered to a supporting structure which may be a woven, non-woven or porous membrane made from a material selected from a group consisting glass fiber, PAN fiber, polyimide, PTFE. Together they form a sheet material which is hereinafter known as an enhanced separator to be placed between the anode and cathode.

The enhanced separator as well as the anode and cathode are positioned in the mold. Thereafter the ionic liquid is poured into the mold for curing. The ionic liquid interacts with the thickener released from the enhanced separator to form a colloidal/non-liquid electrolyte which separates the electrodes and permits ion conduction. The enhanced separator prevents direct contact of the electrodes thereby preventing short circuit during deformation of the electrolyte.

Example 5

Aldehyde or amide polymer is dissolved in solvent such as DMF and the solution is impregnated on the support structure as detailed in Example 4 to form an enhanced separator preferably in the form of a sheet material. In the mold the enhanced separator is positioned between the anode and the cathode. The ionic liquid is then poured into the mold. The ionic liquid and the thickener which is released from the enhanced separator interact to form a colloidal/non-liquid electrolyte which separates the electrodes and permits ion conduction. The enhanced separator prevents direct contact of the electrodes thereby preventing short circuit during deformation of the electrolyte.

Example 6

Amide fiber is blended or mixed with one or more types of fiber and woven to form a cloth which is used as a support structure being placed between the cathode and anode.

Thickener is added to the support structure to result in an enhanced separator in the form of a sheet material.

The ionic liquid is poured into the mold in which the electrodes and the enhanced separator are provided. The ionic liquid and the thickener released from the enhanced separator interact to form a colloidal/non-liquid electrolyte which separates the electrodes and permit ion conduction. The enhanced separator prevents direct contact of the electrodes thereby preventing short circuit during deformation of the electrolyte.

Example 7

Aldehyde or amide polymer may be formed on the support structure by way of electrospinning or meltblown technology. Alternatively, the powder form of aldehyde or amide polymer is carried by high pressure gas that is forcibly propelled against the support structure under high pressure and is embedded in the support structure by way of abrasive blasting or sandblasting.

The polymers in the present invention are prepared by anionic polymerization (for POM) and condensation polymerization (for Nylon), both of which do not require an initiator in the reaction or a termination step at the end of the reaction, which may simplify the battery manufacturing process In addition, the inventors, through their own research, trials and experiments, derived that the present invention is an unexpected outcome in the art. POM and Nylon result in unexpectedly full solidification of the ionic liquid electrolyte yet maintaining the advantages thereof.

The invention has been given by way of example only, and various other modifications of and/or alterations to the described embodiment may be made by persons skilled in the art without departing from the scope of the invention as specified in the appended claims.

The invention claimed is:

1. An electrolyte for use in an energy storage device comprising an ionic liquid and a thickener that interact to form a non-liquid gel network, wherein the thickener comprises polyoxymethylene.

2. The electrolyte as claimed in claim 1, wherein the ionic liquid comprises a compound having the formula:

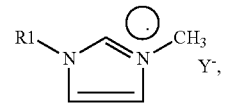

Y = halogen wherein R1 comprises a carbon chain with from 1 to 8 carbon atoms.

3. The electrolyte as claimed in claim 1, wherein the thickener is releasably placed on a support structure to form a sheet material, which is placed between cathode and anode of said energy storage device for releasing the thickener into the ionic liquid.

4. The electrolyte as claimed in claim 3, wherein the support structure comprises a porous membrane.

5. The electrolyte as claimed in claim 4, wherein the porous membrane is a non-woven membrane.

6. The electrolyte as claimed in claim 4, wherein the porous membrane is formed from a material selected from a group consisting of PTFE, PAN, glass fiber and PI.

7. The electrolyte as claimed in claim 1, wherein the polyoxymethylene is of a molecular weight of 10,000-500,000.

8. The electrolyte as claimed in claim 1, wherein the ionic liquid comprises 1-ethyl-3-methylimidazolium, anhydrous aluminum chloride and water.

9. The electrolyte as claimed in claim 8, wherein mole ratio of the anhydrous aluminum chloride and 1-ethyl-3-methylimidazolium is 1.1 to 2.0, and water content is at or below 300 ppm.

10. An energy storage device comprising the electrolyte as claimed in claim 1.

11. A method of making with a non-liquid electrolyte for use in an energy storage device comprising the steps of:
providing an ionic liquid,
providing a thickener, mixing the ionic liquid with the thickener at a specific temperature for a specific mixing time thereby allowing the ionic liquid to interact with the thickener to evolve into a gel network, wherein the thickener comprises polyoxymethylene.

12. The method as claimed in claim 11, wherein the ionic liquid comprises a compound having a formula:

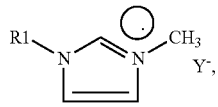

Y = halogen wherein R1 comprises a carbon chain with from 1 to 8 carbon atoms.

13. The method as claimed in claim 12, wherein the ionic liquid comprises 1-ethyl-3-methylimidazolium, anhydrous aluminum chloride and water.

14. The method as claimed in claim 13, wherein mole ratio of the anhydrous aluminum chloride and 1-ethyl-3-methylimidazolium is 1.1 to 2.0, and water content is at or below 300 ppm.

15. The method as claimed in claim 11, wherein the polyoxymethylene is of a molecular weight of 10,000-500,000.

16. The method as claimed in claim 11 further comprises the step of forming a separator comprising the thickener which is inserted into the ionic liquid for releasing the thickener into the ionic liquid.

17. The method as claimed in claim 16, wherein the separator comprises a non-woven or porous membrane.

18. The method as claimed in claim 11 further comprises the step of placing the thickener on a support structure to form a sheet material which is placed between cathode and anode of said energy storage device for releasing the thickener into the ionic liquid.

19. The method as claimed in claim 18 wherein the support structure comprises a porous membrane.

20. The method as claimed in claim 19, wherein the porous membrane comprises a non-woven membrane.

21. The method as claimed in claim 19, wherein the porous membrane is formed from a material selected from a group consisting of PTFE, PAN, glass fiber and PI.

22. The method as claimed in claim 18, wherein the thickener is placed on the support structure by a method selected from a group consisting adhesion; electrospinning; meltblown technology; impregnating a solution comprises the thickener on the support material; and propelling a stream of high pressure gas comprises the thickener against the support material.

23. The method as claimed in claim 11, wherein the specific temperature is about 50-140° C.

24. The method as claimed in claim 11, wherein the specific mixing time is about 1 to 16 hours.

25. An energy storage device comprising the electrolyte formed from the method as claimed in claim 11.

* * * * *